United States Patent [19]

Storm

[11] Patent Number: 4,481,835

[45] Date of Patent: Nov. 13, 1984

[54] DEVICE FOR CONTINUOUS ADJUSTMENT OF THE VIBRATION AMPLITUDE OF ECCENTRIC ELEMENTS

[75] Inventor: Stig Storm, Bromolla, Sweden

[73] Assignee: Dynapac Maskin AB, Solna, Sweden

[21] Appl. No.: 435,618

[22] Filed: Oct. 20, 1982

[30] Foreign Application Priority Data

Oct. 28, 1981 [SE] Sweden ............... 8106358

[51] Int. Cl.³ ........................... F16H 33/20
[52] U.S. Cl. ........................... 74/61; 74/87
[58] Field of Search ............ 74/61, 87; 404/113, 404/117, 121, 114; 173/49

[56] References Cited

U.S. PATENT DOCUMENTS

| | | |
|---|---|---|
| 2,930,244 | 3/1960 | Hutchinson et al. ............. 74/61 |
| 3,192,839 | 7/1965 | Vivier ............. 74/87 X |
| 4,108,009 | 8/1978 | Fuchigami ............. 74/61 |
| 4,211,121 | 7/1980 | Brown ............. 74/87 |
| 4,319,857 | 3/1982 | Reynolds ............. 404/117 |
| 4,350,460 | 9/1982 | Schmelzer et al. ............. 404/117 |
| 4,353,261 | 10/1982 | Salani ............. 74/87 |
| 4,356,736 | 11/1982 | Riedl ............. 74/61 |
| 4,367,054 | 1/1983 | Salani et al. ............. 404/117 |
| 4,412,757 | 11/1983 | Kümmel et al. ............. 404/113 |
| 4,440,034 | 4/1984 | Waschulewski ............. 74/61 |

FOREIGN PATENT DOCUMENTS 313108  6/1929  United Kingdom ............. 74/61

Primary Examiner—Leslie A. Braun
Assistant Examiner—Dwight G. Diehl
Attorney, Agent, or Firm—Brumbaugh, Graves, Donohue & Raymond

[57] ABSTRACT

A hydraulic adjusting system is provided for the continuous adjustment of the vibration amplitude of a rotating eccentric element. The hydraulic adjusting device includes a piston in a single acting cylinder. A piston connecting rod extends through the cylinder and is rigidly journalled axially inside the piston. One end of the rod is rigidly connected to a drive shaft of the eccentric element and the other end to a power source for rotatably driving the eccentric element. The system provides for continuous adjustment of amplitude vibration and, since the vibration amplitude is directly proportional to the hydraulic pressure acting on the piston, the system also facilitates setting and monitoring of such vibration amplitude.

4 Claims, 3 Drawing Figures

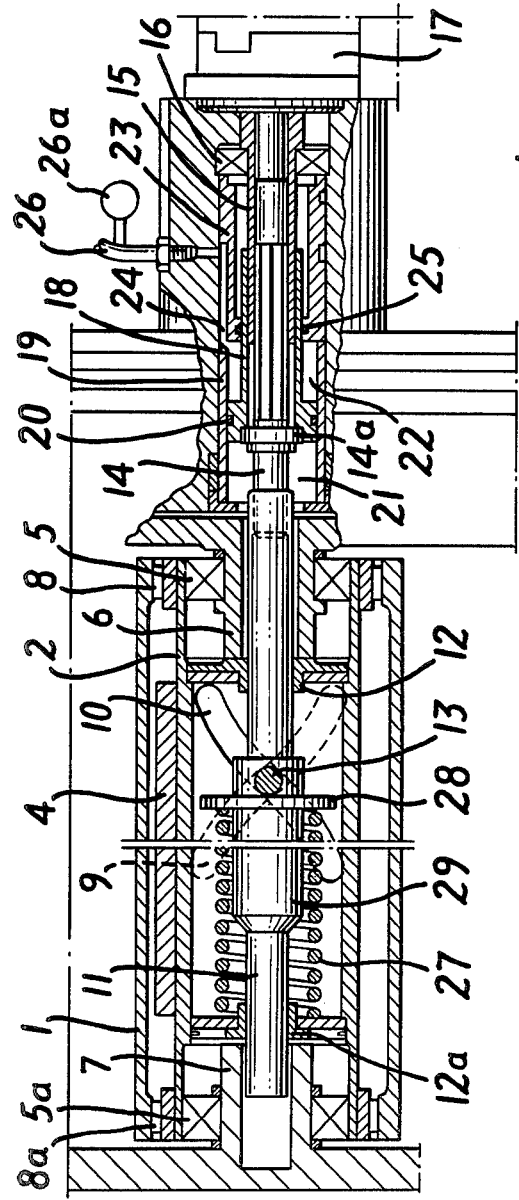
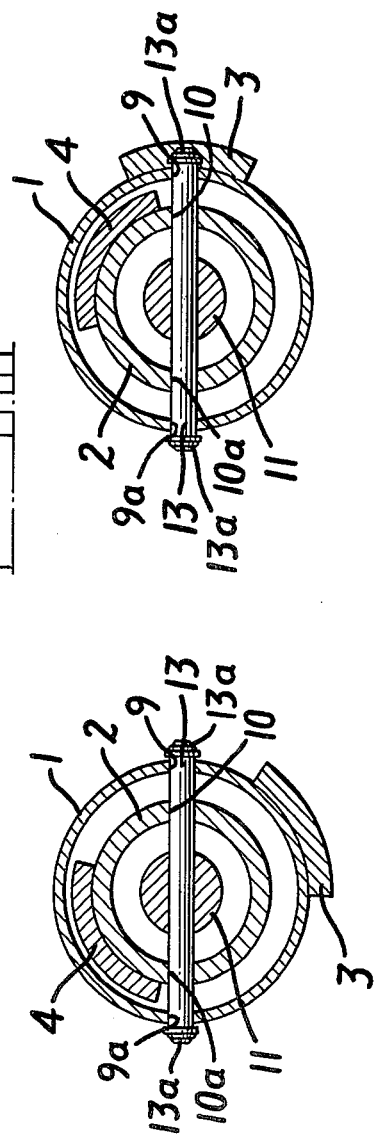
FIG. 1
FIG. 2
FIG. 3

DEVICE FOR CONTINUOUS ADJUSTMENT OF THE VIBRATION AMPLITUDE OF ECCENTRIC ELEMENTS

BACKGROUND OF THE INVENTION

The present invention relates to a device for continuous adjustment of the vibration amplitude of eccentric elements especially designed for soil and asphalt compaction machines.

In the compaction of soil, asphalt and similar materials by means of vibratory rollers, it is often necessary to adapt vibration amplitude to the nature of the bedding in order to achieve the desired compaction effect. As a rule, greater amplitude results in a higher compaction effect across the entire vibration frequency range. This applies in particular to blast stone, stony moraine and cohesive soils. In the final stages of the compaction process, however, it often happens that the machine begins to run irregularly which results in high stresses in all of its parts. By reducing vibration amplitude in the final compaction stages, the irregular motion of the machine can be cured. Thus for every type of bedding it is possible to obtain the maximum compaction effect for the type of compaction machine in use, and at the same time, overcompaction can be avoided or at least reduced. A prerequisite for this operation is the use of a vibration element with continuously adjustable amplitude. It is also necessary that adjustment of the machine can be carried out in such a manner that it is possible to determine with certainty the magnitude of an arbitrarily set vibration amplitude.

Achieving continuous amplitude adjustment by means of hydraulically or electrically powered systems is already known. These systems are often complicated, however, and adjustment cannot as a rule be achieved under all operating conditions. In certain hydraulic systems the volume of oil under pressure is also in rotation, which necessitates a rotary seal with the danger of leakage and troublesome heat generation in the oil as a result.

SUMMARY OF THE INVENTION

The purpose of the present invention is to eliminate the above discussed disadvantages and to achieve a hydraulic adjusting device for continuous adjustment of the vibration amplitude of a rotating eccentric element driven by a drive shaft capable of movement in an axial direction. The hydraulic adjusting device includes a piston in a single acting hydraulic cylinder. A connecting rod of the piston extends through the hydraulic cylinder. The connecting rod is rigidly journalled axially inside the piston with one end rigidly connected to the drive shaft of the eccentric element and the other end to a power source arranged for rotatably driving the eccentric element. Thus the connecting rod is rotatable in the piston.

Through the invention a system is obtained for continuous adjustment of vibration amplitude without the use of rotary seals for the pressure medium employed to adjust the amplitude, and rotation of the pressure medium is avoided. In addition, the amplitude of vibration is directly proportional to the hydraulic pressure acting on the piston, hence the vibration amplitude can readily be adjusted to a desired setting and monitored.

The invention will be more readily understood when the following description is read in connection with the accompanying drawings.

BRIEF DESCRIPTION OF THE DRAWINGS

FIG. 1 shows an axial cross-section through an eccentric element of the type described in British Pat. No. 313,108, for example, in which adjustment of the amplitude is achieved through axial movement of the drive shaft of the eccentric element and an adjusting device connected to such an element; and FIGS. 2 and 3 are cross-sections of FIG. 1 showing the settings of the eccentric weights producing minimum and maximum vibration amplitudes, respectively.

DETAILED DESCRIPTION

In accordance with the embodiment of the invention shown in the drawings, the eccentric element consists of two concentric cylinders 1 and 2, each of which carries its own eccentric weights 3 and 4, respectively. Each end of the inner cylinder 2 is rotatably journalled in bearings 5 and 5a on tubular shaft journals 6 and 7, respectively, which are rigidly connected to the object to be vibrated such as a drum. The outer cylinder 1 is rotatably journalled in bearings 8 and 8a on the inner cylinder 2.

Machined in the wall of the cylinder 1 are two spiral-shaped grooves 9 and 9a each extending along a portion of the periphery of the cylinder. The grooves 9 and 9a spiral in one direction, similarly to threads on a screw, so that a single rod extending through each of the grooves will, when moved axially without rotation along the cylinder 1, cause the cylinder to rotate with respect to the rod.

Similarly, spiral-shaped grooves 10 and 10a are machined in opposite portions of the cylinder 2. However, the grooves 10 and 10a spiral in the direction opposite to that of the grooves 9 and 9a in the cylinder 1.

Extending centrally inside the inner cylinder 2 and concentrically with the tubular shaft journals 6 and 7 is a shaft 11, one end of which is free and the other end connected to the adjusting device of the eccentric element. The shaft journals 6 and 7 are completely separate from shaft 11, which is rotatably journalled in two sliding bearing bushings 12 and 12a. The bushings are mounted rigidly inside cylinder 2, one at each end. A carrier shaft 13 is rigidly mounted perpendicularly on that part of shaft 11 situated inside the inner cylinder 2, passing through shaft 11 and protruding on both sides of it through the spiral-shaped grooves 9, 9a and 10, 10a in cylinders 1 and 2, respectively, see FIGS. 2 and 3. End caps 13a or the like are provided on the shaft 13.

The shaft 11 extends through journal 6 and is rigidly fastened to connecting rod 14 of a single acting hydraulic cylinder incorporated in the adjusting device. A splined sleeve 15 fitting over the splined end of the rod 14 and journalled in bearing 16 at its outer end, is connected to a rotary power source such as a hydraulic motor 17. This arrangement provides a rotatable drive for the connecting rod 14.

The connecting rod 14 is rotatably journalled by journal 14a in a tubular piston 18 which is located in a hydraulic cylinder 19. A piston ring 20 provides a seal between the piston and the inner wall of the cylinder 19. The piston 18 is arranged to slide axially along the splined sleeve 15 which, in operation, is journalled in the piston. Since the piston is axially connected rigidly to the connecting rod 14, both move in an axial direction in relation to the splined sleeve 15, due to the splined coupling between the sleeve and the connecting rod.

The inner cylinder volume is divided by piston 18 into two chambers 21 and 22. The chamber 21 is open and under atmospheric pressure while chamber 22 is in communication with a groove 24 in machined sleeve 23. The sleeve 23 is rigidly mounted and surrounds the rear part of the piston 18 and the splined sleeve 15. The piston 18, capable of axial movement relative to sleeve 23, is sealed in by piston rings 25. The groove 24 is in communication with a hydraulic pump, not shown, via a hose line 26. A pressure responsive device 26a, diagrammatically shown in FIG. 1, monitors the hydraulic pressure acting on the piston 18.

By supplying hydraulic fluid from the pump line 26 and groove 24 to the chamber 22 behind piston 18, the piston is pressed to the left in FIG. 1. Since it is rigidly connected axially to the connecting rod 14, the rod also moves to the left and, due to the splined coupling with sleeve 15, this movement is possible while the sleeve is rotating. The axial movement of the piston is transferred to the shaft 11 which, via carrier shaft 13, causes cylinders 1 and 2 with eccentric weights 3 and 4 to rotate in relation to each other.

Since the grooves 9, 9a and 10, 10a are threaded in different directions on the cylinders 1 and 2, the eccentric weights 3 and 4 will be twisted in opposite directions to each other when the shaft 11 and shaft 13 move axially. A comparatively short axial movement of the shafts 11 and 13 can thus bring about a substantial change in the angular positions of the eccentric weights, with a resulting change in the vibration amplitude.

In accordance with the typical embodiment shown, the hydraulic cylinder is of a single-acting type. In order to apply a return force on the eccentric weights, a spring 27 is arranged between the sliding bearing bushing 12a inside the cylinder 2 and a stop plate 28 rigidly mounted on the shaft 11. In order to position the spring 27 properly, an enlarged portion 29 of the shaft 11, surrounded by the spring 27, is of substanitally the same diameter as the inside diameter of the spring 27.

One of the advantages of a single-acting hydraulic cylinder amplitude adjustment is that the vibration amplitude can be read directly via the hydrauluc pressure shown by instrument 26a. Also the single-acting hydraulic cylinder and the double spiral grooves in cylinders 1 and 2 of the eccentric element enable operation via axial movement of the adjusting elements, thus minimizing the diameter of the resulting structure.

Another advantage of the hydraulic adjusting system according to the invention is the absence of rotary seals for the hydraulic oil. Thus the hydraulic oil under pressure does not rotate, and heat build-up in the oil is avoided.

While the invention has been particularly shown and described with reference to a typical embodiment, it should be understood that various changes in form and details may be made without departing from the scope of the invention which is defined in the appended claims.

I claim:

1. Apparatus for continuous adjustment of the vibration amplitude of a rotating eccentric element comprising means for mounting two concentric tubular eccentric weights for rotation in relation to each other, a drive shaft extending through the eccentric weights, means for mounting the drive shaft for axial movement relative to the eccentric weights, means for connecting the drive shaft to the eccentric weights, said connecting means providing for rotation of the eccentric weights upon rotation of the drive shaft to generate vibrations, said connecting means also providing for the rotation of the eccentric weights relative to each other when the drive shaft is moved axially of the tubular eccentric weights, a hydraulic cylinder, a piston in the hydraulic cylinder, means for supplying hydraulic fluid to the cylinder to move the piston axially, a connecting rod extending through the piston and cylinder, means for journalling the rod in the piston for rotation relative to the piston without axial movement relative to the piston, one end of the connecting rod being rigidly connected to the drive shaft, and means for coupling the other end of the connecting rod to a power source for rotating the drive shaft.

2. Apparatus as defined in claim 1, wherein the means for coupling the other end of the connecting rod to the power source includes a splined sleeve connected at one end to the power source, and a splined coupling between the other end of the sleeve and the connecting rods, whereby the connecting rod can move axially relative to the sleeve during rotation of the sleeve by the power source.

3. Apparatus for continuous adjustment of the vibration amplitude of a rotating eccentric element comprising means for mounting two concentric tubular eccentric weights for rotation in relation to each other, a drive shaft extending through the eccentric weights, means for mounting the drive shaft for axial movement relative to the eccentric weights, means for connecting the drive shaft to the eccentric weights, said connecting means providing for rotation of the eccentric weights upon rotation of the drive shaft to generate vibrations, said connecting means also providing for the rotation of the eccentric weights relative to each other when the drive shaft is moved axially of the tubular eccentric weights, a single acting hydraulic cylinder, a piston in the hydraulic cylinder, means for supplying hydraulic fluid to the cylinder to urge the piston in one axial direction, means for monitoring the hydraulic pressure acting on the piston, a connecting rod extending through the piston and cylinder, means for journalling the rod in the piston for rotation relative to the piston without axial movement relative to the piston, one end of the connecting rod being rigidly connected to the drive shaft, means for coupling the other end of the connecting rod to a power source for rotating the drive shaft, spring means on the drive shaft providing a return force on the drive shaft acting in the other axial direction against the hydraulic piston, whereby the hydraulic pressure observed on the monitor is directly proportional to the vibration of the eccentric weights.

4. Apparatus as defined in claim 3, wherein the means for coupling the other end of the connecting rod to the power source includes a splined sleeve connected at one end to the power source, and a splined coupling between the other end of the sleeve and the connecting rods, whereby the connecting rod can move axially relative to the sleeve during rotation of the sleeve by the power source.

* * * * *